United States Patent [19]
Hillebrand et al.

[11] Patent Number: 4,854,409
[45] Date of Patent: Aug. 8, 1989

[54] LIFT AXLE CONTROL SYSTEM

[75] Inventors: Robert D. Hillebrand, Grand Rapids; Charles W. Wilson, Muskegon, both of Mich.

[73] Assignee: Lear Siegler, Inc., Santa Monica, Calif.

[21] Appl. No.: 122,399

[22] Filed: Nov. 19, 1987

[51] Int. Cl.$^4$ ............................................. B62D 61/12
[52] U.S. Cl. .................................. 180/24.02; 180/290
[58] Field of Search ...................... 180/24.02, 209, 290; 280/704

[56] References Cited

U.S. PATENT DOCUMENTS

| | | | |
|---|---|---|---|
| 2,777,529 | 1/1957 | Harbers | 180/22 |
| 3,201,141 | 8/1965 | Bernstein et al. | 280/104.5 |
| 3,494,632 | 2/1970 | Bostrom | 180/22 |
| 3,499,663 | 3/1970 | Hedlund et al. | 280/124 |
| 3,877,715 | 4/1975 | Thayer et al. | 280/81 A |
| 4,141,430 | 2/1979 | Eddy, Jr. | 180/105 E |
| 4,173,259 | 11/1979 | Heckenkromp | 180/290 |
| 4,284,156 | 8/1981 | Carstensen et al. | 180/24.02 |

FOREIGN PATENT DOCUMENTS 2652811  5/1978  Fed. Rep. of Germany ...... 180/209

OTHER PUBLICATIONS

Neway, "Neway Air Ride", Brochure-Copyright 1986.

*Primary Examiner*—Charles A. Marmor
*Assistant Examiner*—Ross Weaver
*Attorney, Agent, or Firm*—Varnum, Riddering, Schmidt & Howlett

[57] ABSTRACT

A control system for a lift axle suspension wherein two or more axle suspensions are mounted on a vehicle frame and a liftable axle is automatically raised or lowered depending on the load on another of the axle or axles. An override to the automatic lift system is provided when the vehicle is fully loaded to lift a liftable axle selectively for a limited, relatively short period of time to assist in maneuvering the vehicle. The control system detects the load on one axle and automatically raises the second axle to the raised position when the load on the first axle is below a first predetermined value and automatically lowers the second axle to the lower position when the lower load on the first axle is above a predetermined value which is greater than the first predetermined value. A delay is provided in the operation of the control system to lower the second axle upon the detection of the load on the first axle to compensate for road bumps. An electrical sensor coupled to the load detector provides a signal to an electrical circuit in the controller to control the operation of the second axle.

23 Claims, 6 Drawing Sheets

LIFT AXLE CONTROL SYSTEM

FIELD OF THE INVENTION

This invention relates to control systems for a lift axle in a two- or more-axle suspension for wheeled vehicles. In one of its aspects, the invention relates to a lift axle control system having a means for automatically raising and lowering a lift axle depending on the load in the full time down axle(s).

STATE OF THE PRIOR ART

Multi-axle suspensions, commonly found on trucks and trailers, typically have suspension systems which provide for selective raising and lowering of one axle with respect to the other. A control system for raising and lowering the liftable axle with respect to the "down" axle or axles is sold by the Truck Products Division of Lear Siegler, Inc. In this system, a manual toggle switch in the cab of the vehicle controls the operation of a solenoid valve which in turn controls the flow of air to air-lift air springs and to supporting air springs for the liftable axle. When the switch is open, the liftable axle is in its lowered position so that the wheels supported by the axle are in load-supporting condition. When the switch is closed, the liftable axles are raised so that the wheels attached thereto are out of contact with the road.

The U.S. Pat. No. 3,494,632 to Bostrom, issued Feb. 10, 1960, discloses a means for controlling the load on a third axle in a three-axle suspension through electrically operated valves which can selectively decrease or completely eliminate the pressure in a supporting air spring in the third axle. However, a pneumatic override control prevents the exhausting of all of the air from the supporting spring for the third axle in the event that the load on the other axles is above a predetermined value. The electrically operated valves are controlled through a switch in the cab of the vehicle.

The U.S. Pat. No. 3,201,141 to Bernstein et al, issued Aug. 17, 1965, discloses a tandem-axle suspension with a lift-axle lift which is controlled automatically or manually. Automatic control of the lift axle is provided through a pneumatically operated valve which senses the pressure in the down axle air spring. Manual control is provided with an electrically operated switch.

The U.S. Pat. No. 3,499,663 to Hedlund et al, issued Mar, 10, 1970, discloses a control system for automatically raising and lowering an idle axle in a tandem-axle suspension. Hedlund et al sense the load on an axle bearing leaf spring through a lever arm, one end of which is connected to an end of the leaf spring and the other end of which is connected to the idle-wheel axle. Increased load on the leaf spring is sensed by a hydraulic cylinder which is directly connected to the idle shaft and results in an automatic lowering of the idle shaft when the pressure sensed by the hydraulic cylinder rises above a predetermined value. An electrical switch is provided to override the automatic control system to raise the idle axle as desired or to lower the idle axle as desired when a contrary condition would appear in the system.

The U.S. Pat. No. 4,284,156 to Carstensen et al, issued Aug. 18, 1981, discloses a vehicle having two rear axles, one of which is liftable with respect to the other and is automatically controlled so that the axle is lifted when the load on the nonliftable axle is below a predetermined value and is raised when the load is above a predetermined value. The control system is a pneumatic system which incorporates adjustable throttles so that short-term pressure variations will not cause raising or lowering of the liftable axle. This control system requires sensors for the magnitude of both the liftable and the nonliftable axles, which loads are totaled to control the operation of the control elements.

The U.S. Pat. No. 4,141,430 to Eddy, Jr., issued Feb. 27, 1979, discloses a tag axle control system in which the load is transferred between the driven axle and the tag axles in accordance with the relative speeds of the driven and nondriven wheels.

The U.S. Pat. Nos. 3,877,715 to Thayer et al, issued 3,877,715, discloses an auxiliary axle control system in which the pressure in a rear axle is controlled in accordance with the deceleration of the vehicle.

The U.S. Pat. No. 2,777,529 to Harbers, issued Jan. 15, 1957, discloses a weight distribution system for three-axle vehicles in which a hydraulic control system is adapted to shift the weight automatically or manually between the axles.

SUMMARY OF THE INVENTION

According to the invention, a control system is provided for lift axle suspension wherein two or more axle suspensions are mounted to a vehicle frame, and wherein the liftable axle in the system is automatically raised and lowered depending on the load on an other axle or axles, yet there is provided a means to override the automatic system when the vehicle is fully loaded to lift the liftable axle selectively for limited, relatively short periods of time to assist in maneuvering the vehicle. The control system is relatively simple, yet durable and accurate, and is easily installed on the vehicle.

The control system according to the invention is used on suspensions for wheeled vehicles wherein first and second axles are connected to a vehicle frame through first and second suspensions, respectively. The second suspension has means to mount the second axle for movement between a raised position and a lowered position, and an actuation means for moving the second axle between the raised and lowered positions. The second axle typically has wheels for supporting engagement with the ground when the second axle is in the lowered position and the wheels are out of contact with the ground when the second axle is in a raised position. The control means have means to detect the load on the first axle and for automatically raising the second axle to the raised position when the load on the first axle is below a first predetermined value, and a means for automatically lowering the second axle to the lower position when the load on the first axle is above a second predetermined value which is greater than the first predetermined value. Means are provided to delay the operation of the actuation means to lower the second axle upon detection of a load on the first axle to compensate for road bumps. The invention provides an improvement in the load-detecting means which comprises electrical sensing means, and the control means has an electrical circuit to control the activation means responsive to a signal from the electrical sensing means. Further, the invention provides a means to manually override the control means for a limited, relatively short period of time when the second axle is in the lower position so that the second axle can be selectively raised for short periods of time to enhance maneuverability of the vehicle during the relatively short period of time. The control system limits the extent of time in which the second axle can be raised and automatically lowers the second axle after the relatively short period of time.

Preferably, the first suspension comprises an air spring and the means to detect the load on the first axle comprises a means to detect the pressure in the first suspension air spring. Alternatively, the first suspension can be a mechanical suspension, such as a leaf spring, and the means to detect the load on the first axle can be a strain gauge. Further, a strain gauge can be used to detect the load on the first axle when the first axle is supported by an air spring.

The control system finds suitability in use where an air spring is used for cushioning the second axle with respect to the vehicle frame and an air cylinder is provided for actuating the raising and lower of the second axle with respect to the frame. In this system, the control means further comprises means to release air from the second suspension air spring and simultaneously to pressurize the air cylinder when the second axle is moved between the lowermost position and the raised position.

In a preferred embodiment of the invention, the means to delay the operation of the actuation means comprises an electrical time-delay circuit. Further, in accordance with a preferred embodiment of the invention, an electrical time-delay circuit is used to time the relatively short period of time when the override means is operative.

For comparative purposes, the relatively short period of time in which the override means is operative is substantially longer than the time delay for operation of the actuation means. By way of example, the relatively short period of time for temporarily raising the lift axle is in the range of ½ to 3 minutes and the time delay for operation of the actuation means is in the range of ¼ to 2 seconds.

Preferably, the pressure detection means comprises a pressure switch which has a first electrical output when the pressure in the air spring corresponds to the load on the axle below the first predetermined value and has a second electrical output when the pressure in the air spring for the first suspension corresponds to a load on the axle above the second predetermined value. Preferably, the difference between the first and second predetermined values corresponds to a range of 5-15 psi in the first suspension air spring.

BRIEF DESCRIPTION OF THE DRAWINGS

The invention will now be described with reference to the accompanying drawings in which.

DETAILED DESCRIPTION OF THE PREFERRED EMBODIMENT

Figure 1:
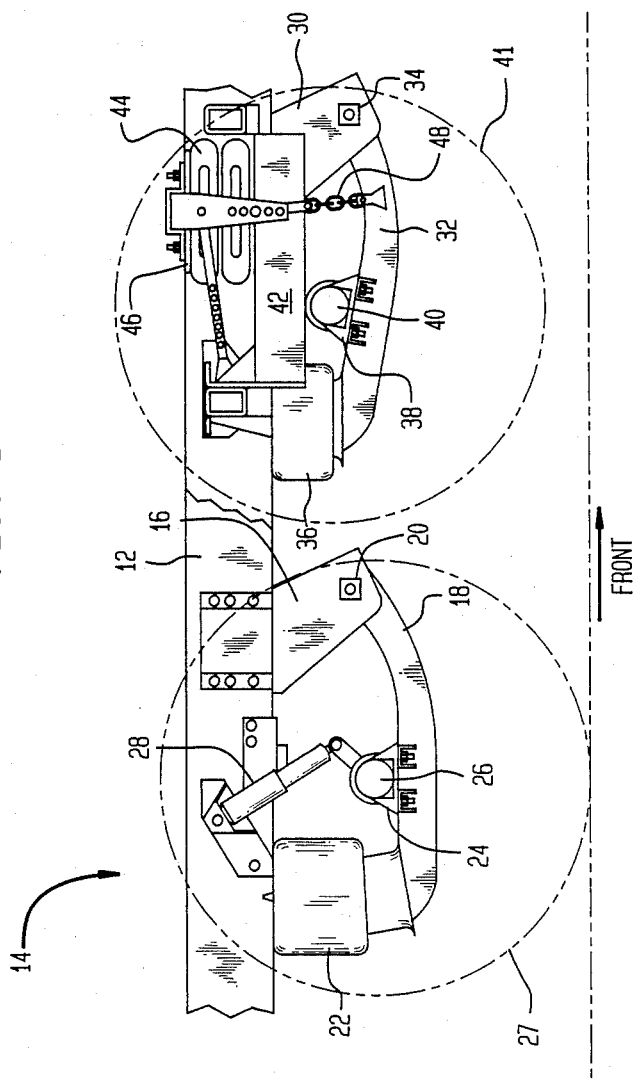
FIG. 1 is a schematic side elevational view of a prior art tandem axle air spring suspension with an air spring lift mechanism on which the control system according to the invention is operative.

Referring now to the drawings, and to FIG. 1 in particular, there is shown a vehicle suspension system which is mounted on a vehicle frame 12 of, for example, a truck or trailer. The conventional trailing arm suspension 14 comprises a frame bracket 16 secured to the vehicle frame 12, a rigid trailing arm 18 pivotally mounted to the frame bracket 16 through a pivot mount 20 and an air spring 22 mounted between the free end of the trailing arm 18 and the vehicle frame 12 An axle bracket 24 is mounted at a central portion of the trailing arm 18 and mounts an axle 26. A shock absorber 28 is mounted between the frame 12 and the rigid trailing arm 18. Wheels 27, one of which is shown in phantom lines, are mounted on the axle 26 to support the frame 12 above the ground 10 through the suspension 14.

The conventional trailing arm suspension 14 is mounted in tandem with a liftable suspension of similar construction. The liftable suspension comprises a frame bracket 30 mounted to the vehicle frame 12, a rigid trailing arm 32 pivotally mounted to the frame bracket 30 through a pivot mount 34 and an air spring 36 mounted between the free end of the trailing arm 32 and the vehicle frame 12. An axle bracket 38 is mounted to a central portion of the trailing arm 32 and mounts a liftable axle 40. A lift spring bracket 42 is mounted to the frame 12 and in turn mounts a lift air spring 44. A top plate 46 is mounted to an upper portion of the lift air spring 44 and mounts a connector linkage 48 which, in turn, is mounted to the trailing arm 32. Wheels 41, one of which is shown in phantom lines, is mounted to the axle 40 to engage the ground 10 when the axle 40 is in the lowered position.

In operation, the conventional trailing arm suspension 14 supports the vehicle frame 12 through wheels 27 mounted to the axle 26. The air spring 22 is pressurized with air to cushion the movement of the trailing arm with respect to the frame and also to support the frame on the lower portion of the trailing arm. The liftable suspension provides support to the frame through wheels 41 when the suspension is in its lowered position and functions in the same fashion as the conventional trailing arm suspension 14 in this position. On the other hand, when the vehicle is not particularly loaded, the liftable suspension can be raised to relieve the wheels 41 from contact with the ground and thereby relieve the suspension from supporting the frame. In order to accomplish this function, the air spring 44 is pressurized and the air spring 36 is depressurized. Thus, the air spring 44 will raise the trailing arm 32 to the position illustrated in FIG. 1.

The foregoing has been a description of a conventional tandem axle suspension with a liftable axle. Conventionally, control systems have been provided to control the raising and lowering of the liftable trailing arm suspension. Briefly, the control system has generally included a manual switch in the vehicle cab to control valves in the air supply system to the air springs 44 and 36 for control of the lifting. These systems have relied on the vehicle operator to determine when the vehicle is sufficiently loaded in order to lower the liftable suspension and when the vehicle is sufficiently unloaded to raise the suspension. In some prior art systems, sensors have detected the load on the down axle and have operated lights in the cab to alert the vehicle operator when the liftable axle should be raised or lowered. This system relies on the operator to make judgments and to exercise that judgment. In the past, the operator judgment may have been in error or the operator may simply have not exercised his judgment to raise or lower the suspension systems at an appropriate time. The result of the error is excessive wear on the conventional trailing arm suspension, excessive tire and road wear, excessive use of fuel, and reduced vehicle stability.

Figure 2:
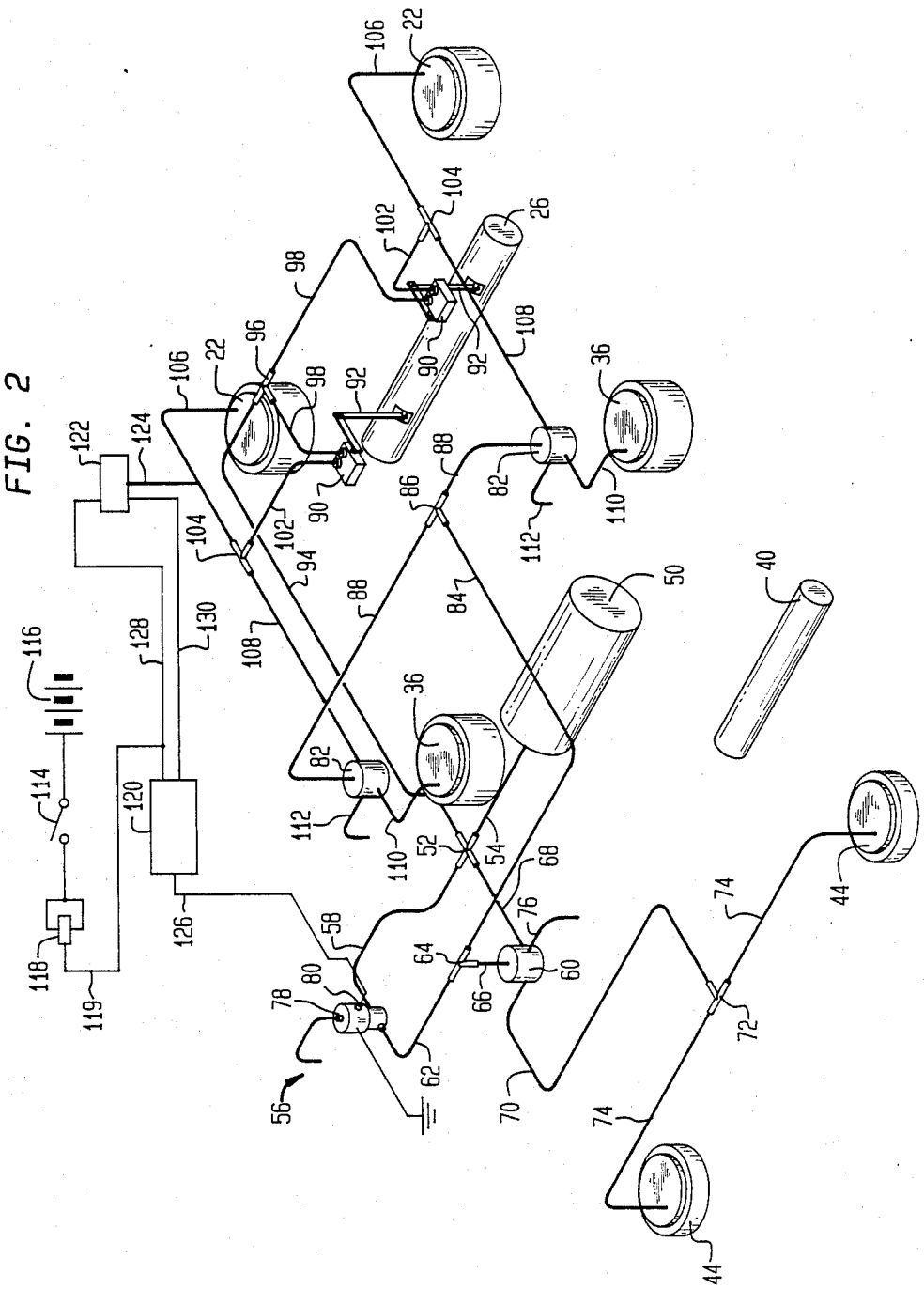
FIG. 2 is a schematic pneumatic and electrical diagram of the control system according to the invention for an air spring suspension with an air spring lift shown in FIG. 1.

Referring now to FIG. 2, there is shown a schematic, electrical and pneumatic control system according to the invention for automatically controlling the position of the liftable suspension so that the suspension is lowered when the load on the vehicle is above a predetermined level and is raised when the load on the vehicle is below a predetermined level. The control system according to the invention can be employed with a conventional air control system for raising and lowering the liftable axle suspension. Conventional lifting systems can be easily adapted to provide for automatic control in accordance with the invention.

Referring now to FIG. 2, where like numerals are used to represent like parts, there is shown a pressure tank 50 which is connected to a normally closed solenoid control valve 56 through a coupling 52, a pipe 54 and an inlet pipe 58. In the absence of electrical energy to solenoid valve 56, it will not pass air pressure therethrough between pipes 58 and 62. The outlet pipe 62 from the solenoid control valve 56 is connected to the control inlet of control valve 60 through pipe 62, T-connector 64 and pipe 66. The control valve 60 has a normally closed inlet port connected to pipe 68 which is connected to coupling 52 for supply of air pressure to the control valve 60. An outlet pipe 70 connects the control valve 60 with the air lift springs 44 through T-connector 72 and pipes 74. A normally open inlet port 76 is open to the atmosphere and allows atmospheric pressure to pass through the valve 60 and into the lift air springs 44 in the absence of pressure in pipe 66.

The solenoid control valve 56 is shown in enlarged form and is spaced from a schematic representation in the pneumatic circuit in FIG. 2 for clarity. It has an exhaust port 78 which is open to the atmosphere. An electrical input line 80 typically is connected directly to a manual toggle switch 114 for operating the solenoid valve. A 12 Volt vehicle battery 116 is connected to the solenoid valves 56 through the toggle switch 114. An electrical connection 118 is provided in an electrical control line 119 between the cab and the trailer in a tractor-trailer vehicle.

Control valves 82 are provided for controlling the air pressure to the air springs 36. To this end, controlled air pressure is provided to the control air inlet to the control valves 82 through pipes 84, T-connector 86 and pipes 88. Leveling valves 90 have a linkage 92 connected to the axle 26 to sense the position of the axle 26 with respect to the frame 12 and control the air inlet to the air springs 22 in accordance therewith to maintain the position of the trailing arm at a relatively constant level with respect to the frame 12. Air pressure is supplied to the leveling valves 90 from the coupling 52 through pipe 94, T-connector 96 and pipes 98. The output from the leveling valve 90 is provided to the air springs 22 through pipes 102, T-connector 104 and pipe 106. In like manner, air pressure is provided from the leveling valves 90 to the air springs 36 through the T-connector 104, pipes 108, control valves 82 and pipes 110. An exhaust pipe 112 is provided in the control valves 82 to exhaust air from the air spring 36 under appropriate conditions. The pipes 110 are connected between a cylinder port in the control valves 82 and the air springs 36. Control valves 82 are normally open to pass air pressure between pipes 108 and 110 in the absence of control pressure in pipes 88. When pipes 88 have a control pressure, the valves 82 close to block communication between pipes 108 and 110, which, at the same time, open communication between pipes 110 and exhaust port 112.

Conventionally, the solenoid valve is controlled by the manual toggle switch 114 in the vehicle cab through electrical line 119 which is coupled directly to the electrical input 80 for the solenoid valve 56. When the switch 114 is open, the solenoid valve 56 will be closed so that no air pressure will be provided to the control openings in the control valve 60 and in the control valves 82. Thus, the control valve 60 will provide open communication between the normally open exhaust port 76 and the pipe 70 to exhaust air from the lift air springs 44. At the same time, air pressure will be applied to the air springs 36 to maintain the second suspension in a down or supporting position.

When it is desired to raise the axle 40, the vehicle operator closes the switch 114 to thereby energize the solenoid in the solenoid valve 56, thereby applying air pressure to the control inlets for the control valve 60 and the control valves 82. Air pressure is then passed through the control valve 60 to the lift air springs 44 to inflate the lift air springs 44 and raise the axle 40. At the same time, air pressure is exhausted from the air springs 36 through control valves 82. The foregoing is a description of a conventional pneumatic and electrical control system for a tandem-axle suspension system with a liftable axle.

In accordance with the invention, means are provided for automatically raising and lowering the liftable axle 40 in accordance with the vehicle load and for selectively raising the liftable axle for relatively short periods of time. An electrical controller 120 is provided to control the operation of the solenoid valve 56 in accordance with the pressure detected in the system. A pressure switch 122 senses the pressure in the air spring 22 through a pressure line connection 124. As shown in FIG. 2, the pressure line connection 124 is coupled to the air supply pipe 106. The pressure switch 122 is electrically coupled to the controller 120 through control lines 128 and 130. The controller 120 is coupled to the electrical input 80 for the solenoid valve 56 through the control output line 126.

Figure 3:
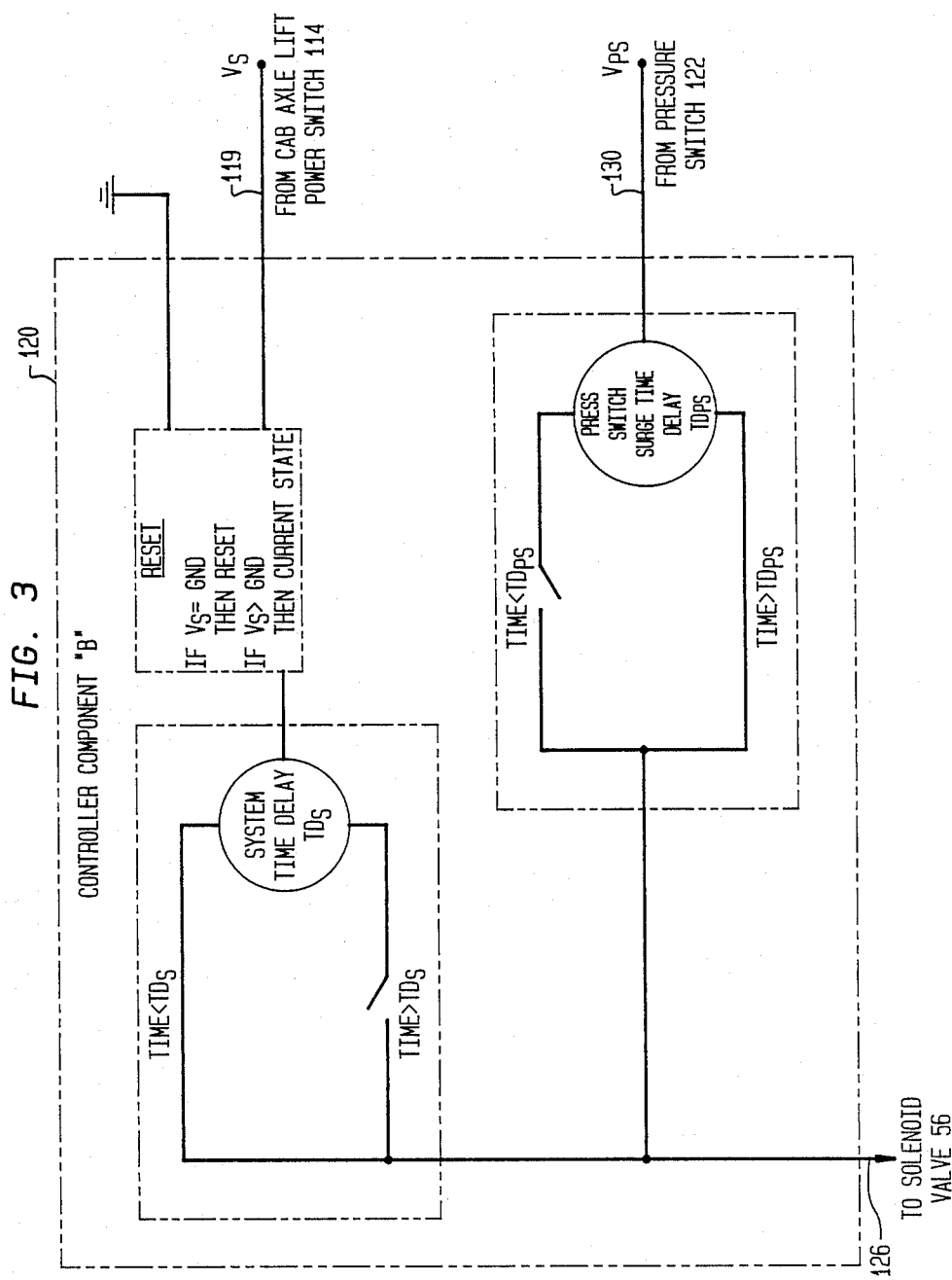
FIG. 3 is a schematic flowchart of the electrical system shown in FIG. 2.

Referring now to FIG. 3, a flow chart for controller 120 is illustrated. Inputs from the control line 119 pass through a reset circuit and then into a time-delay circuit. The reset circuit resets the time-delay circuit each time the toggle switch 114 is opened. The time-delay circuit is adapted to pass the current from line 128 to the solenoid valve 56 when the toggle switch 114 is closed. After a predetermined time delay determined by $TD_S$, the time-delay circuit is opened so that current to the solenoid valve 56 is cut off. Typically, the time delay $TD_S$, will be set for about one minute although a suitable range would be ½–3 minutes. Thus, when the toggle switch is initially closed, current will be applied to the solenoid valve 56 for about one minute before the time-delay TD$_S$, cuts off the current flow from line 119 to line 126.

A voltage is also applied to the pressure switch 122 through line 128. In the event that the pressure switch is closed, current will flow through line 130 to the control circuit 120. Another time-delay circuit in control circuit 120 controls the current flow from line 130 to the line 126. There is a surge time delay for the current flow through the pressure-switch time delay to accommodate road bumps and aberations. Thus, when the voltage is first applied in line 130, the current flow to line 126 would be blocked for a predetermined time, TD$_{PS}$, which typically is about ½ second. A range of ¼ second to two seconds would be a satisfactory range of time for this time delay. After that time delay, the time-delay circuit closes to pass the current from control line 130 to control output line 126.

When the pressure to the pressure switch 122 rises above a predetermined level, then a signal is interrupted from the pressure switch 122 to the controller 120. The controller 120, without a signal from the pressure switch 122 will then open the circuit to the solenoid valve 56 so that the liftable axle will be lowered into a supporting position.

Figure 4:
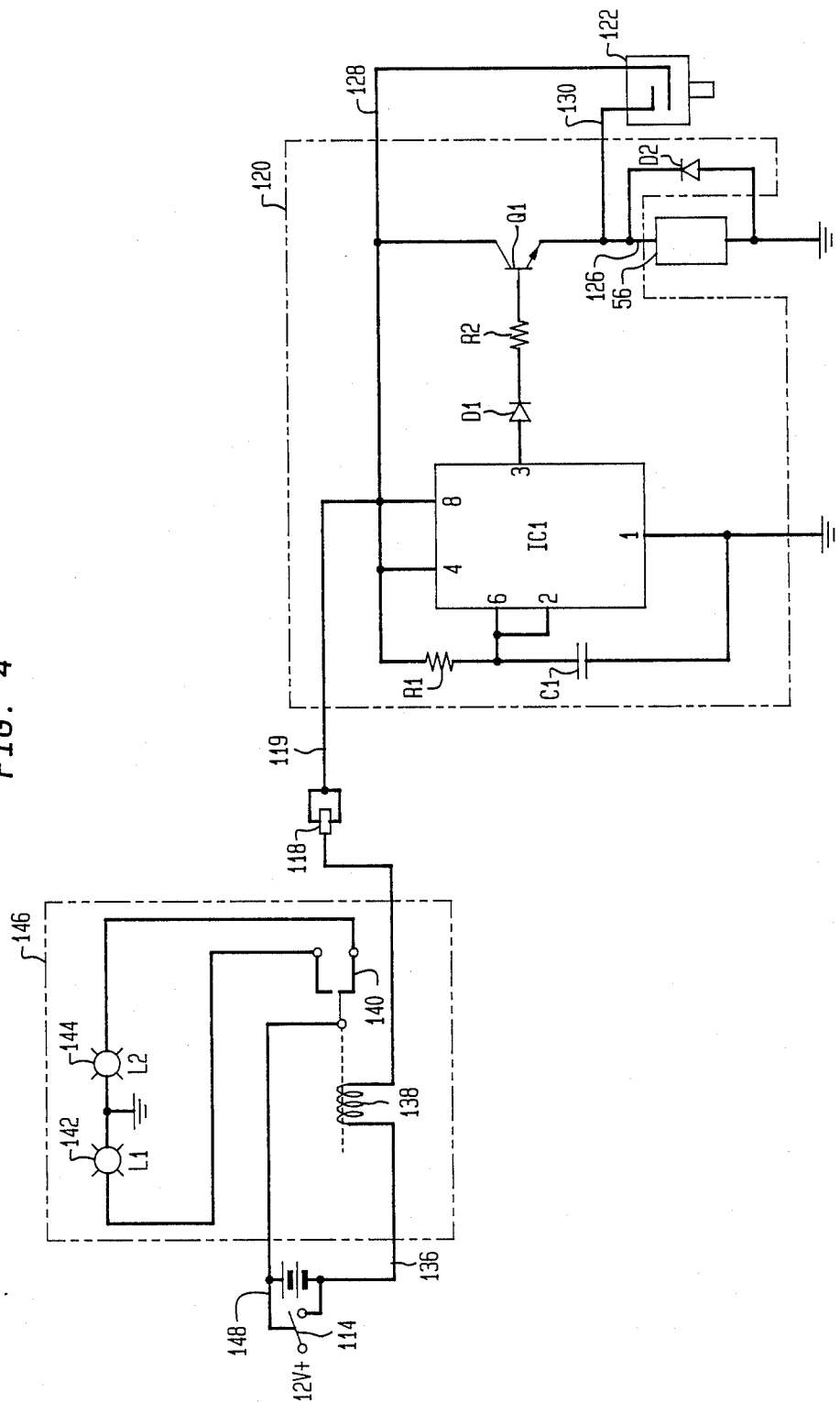
FIG. 4 is a schematic diagram of the electrical system shown in FIG. 2.

Referring now to FIG. 4, there is shown an electrical schematic of the control system according to the invention. The switch 114 is connected to a lamp illumination circuit 146 which includes axle up lamp 142 and an axle down lamp 144. The lamps 142 and 144 are connected to the power source through a lead line 148 and a reed switch 140. The reed switch 140 is controlled by a coil 138 in the lead line 136. When electrical current is passing through the coil 138, the reed switch 140 will direct the current through the lamp 42 to ground. Conversely, when no current is flowing through coil 138, the reed switch 140 will direct the current in line 148 through the lamp 144 to ground.

The controller 120 comprises an integrated timing circuit IC1 which, for example, can be a 555 timer integrated circuit. IC1 performs the timing functions described above with reference to FIG. 3. A resistor R1 which can be a 220K timing resistor is connected between ports 6 and 4 of the IC1 to set the time delay TD$_S$. A capacitor C1, for example, a 470-microfarad electrolytic capacitor is connected between ports 6 and 1 of the circuit IC1 to perform the reset function described above with reference to FIG. 3. The output from IC1 passes through a blocking diode D1, which can be an IN-4002 one-watt diode, and to a resistor R2, for example, a 220-ohm resistor. An NPN power transistor Q1 is connected to the resistor and functions as a switch. The output from the switch 122 is connected across the transistor Q1. A diode D2 is connected across the load solenoid in the valve 56 as a spike bypass.

In operation, when the toggle switch 114 is in the open position, as illustrated in FIG. 2, for example, the solenoid 56 will be closed, whereby no air pressure will be supplied to the control valve 60. Thus, air will be exhausted from the lift air springs 44 through the control valve 60. At the same time, no control air is supplied to the cylinder valves 82, whereby the air springs 36 will be pressurized so that the lift axle 40 is in its lowered position. In this condition, the current flow in FIG. 4 is through lead line 148, reed switch 140 and lamp 144, indicating to the driver in the cab that the lift axle is in its lowermost position.

When the toggle switch 114 is closed, current will flow through the lead line 136, through the coil 138 to switch the reed switch 140 to cause current to flow through the lamp 142 to ground, thereby indicating that the lift axle 40 has been raised. At the same time, current flows to the integrated circuit IC1 and through the time delay TD$_S$. Because the voltage input to the integrated circuit had previously been at zero, the integrated circuit will pass the current through the diode D1, the resistor R2 and through the transister Q1 to the solenoid control valve 56. At the same time, the time-delay TD$_S$ will begin timing for a relatively short, predetermined period time, for example, one minute. During this period of time, the solenoid valve 56 will open, to thereby permit pressurized air to pass therethrough to the lift air springs 44. At the same time, control air pressure is applied to the control valves 82 through lines 88 to permit air in the air springs 36 to be exhausted through the exhaust ports 112. Thus, the lift axle 40 is raised. This condition will continue for the extent of the time-delay TD$_S$, for example, one minute. Absent a signal from the pressure switch 122, current through IC1 will be blocked, whereby the solenoid valve 56 will again close to lower the lift axle 40.

The pressure switch 122 is adapted to sense the pressure in the air springs 22. Thus, in the event that the pressure sensed by the pressure switch 122 is above a predetermined value, the switch 122 will open to prevent any further current flow through the transister Q1 after the timer TD$_S$ is timed out. Thus, in the event that the pressure in the air spring 22 exceeds a predetermined value, the lift axle 40 will be automatically lowered after a predetermined time, for example, one minute. However, the system allows the operator to raise the lift axle 40 for short periods of time, such as when maneuvering the vehicle around a curve, for example, to assist in controlling the vehicle. However, the automatic return feature of the system prevents the axle from being retained in the raised position for extended periods of time.

On the other hand, in the event that the pressure in the air springs 22 is below a predetermined value, the pressure switch 122 will close, and thereby permit current to continue to pass through IC1 and Q1 to the solenoid 56. However, in the event that the load changes from below the predetermined value to above the predetermined value, there is a time delay TD$_{PS}$, which must occur before the transistor will be switched off to block current flow to the solenoid 56. Thus, when the axle 40 is up and axle 26 experiences a momentary load as, for example, would occur from a road bump, a momentary pressure rise will open the pressure switch 122 and send a signal to the integrated circuit IC1. However, the circuit will not pass current until the time delay passes and the signal remains. If it is a momentary surge in the pressure, the pressure switch will once again close to allow current to continue to pass through the transistor Q1 to the solenoid 56.

If the pressure switch 122 were set to open and close at the same predetermined value, then the axle would cycle between an up and down position when the load in the vehicle was at or near the predetermined load measured by the pressure switch. In other words, lowering the lift axle 40 will reduce the load on the axle 26 and thus reduce the pressure in the air spring 22. If the pressure switch is very sensitive to this small change in load in the axle 26, then the lift axle would be immediately raised, at which time the load would again exceed the predetermined value. In order to overcome this problem, a hysteresis is built into the system, principally into the pressure switch 122. Preferable, there is approximately a 5 to 15 psi difference between the load at which the switch opens and the load at which the switch closes. In other words, the pressure switch 122 opens at a higher pressure than the pressure at which it closes. Other factors which affect the hysteresis are the load on the axles, the number of axles, the air spring and the type and capacity of the suspension.

The invention provides an opportunity for the driver to interface with the control system for the lift axle to maneuver into tight spaces and to steer the vehicle around curves. Further, the invention permits the system to be used with multiple lift axles in a trailer where two or more suspensions have axles which are liftable. The invention provides a system wherein a single pressure switch is used to control the position of the liftable axle.

Figure 5:
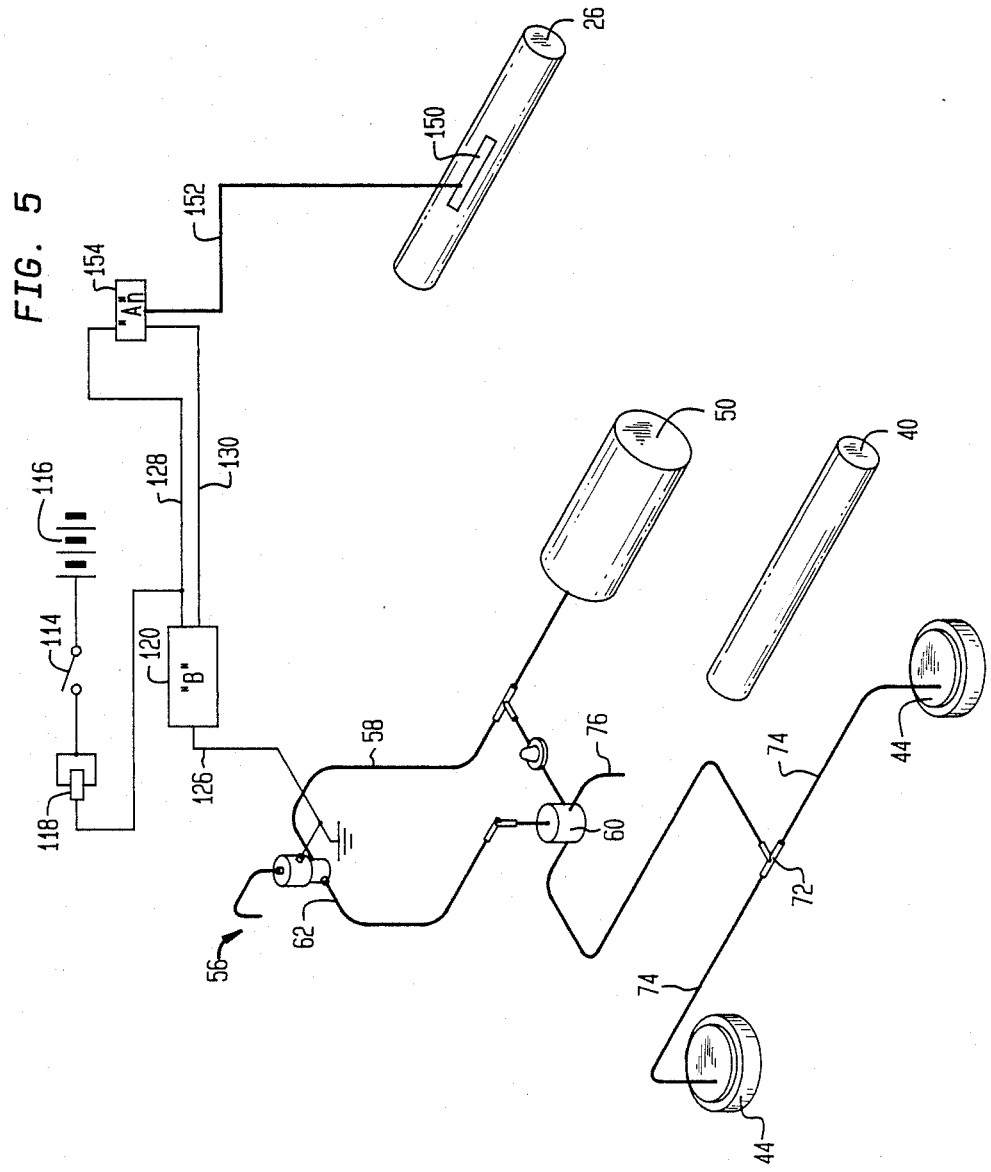
FIG. 5 is a schematic pneumatic and electrical diagram of a second control system according to the invention.

Referring now to FIG. 5, like numerals have been used to designate like parts. In FIG. 5, a second embodiment of the invention is shown wherein the bending of an axle is detected rather than the pressure in an air spring. This system can be used in an air-spring suspension or, alternatively, in a mechanical leaf-spring suspension. An axle transducer 150 is mounted on the axle 26 to detect the load in the axle. The output from the axle transducer 150 is connected to a transducer circuit 154 through a control line 152. Thus, the transducer circuit detects the load on the axle 26 through the transducer 150. When the load is above a predetermined level, a signal will be sent through control line 130 to the controller 120 to lower the axle. When the pressure is below a predetermined level, no signal will be sent to the controller. Like the first embodiment, a hysteresis is incorporated in the axle transducer 150 and/or the transducer circuit 154 so that the signal to the control circuit 120 to lower the axle 40 occurs at a higher load on axle 26 than this signal to raiser the axle 40.

Figure 6:
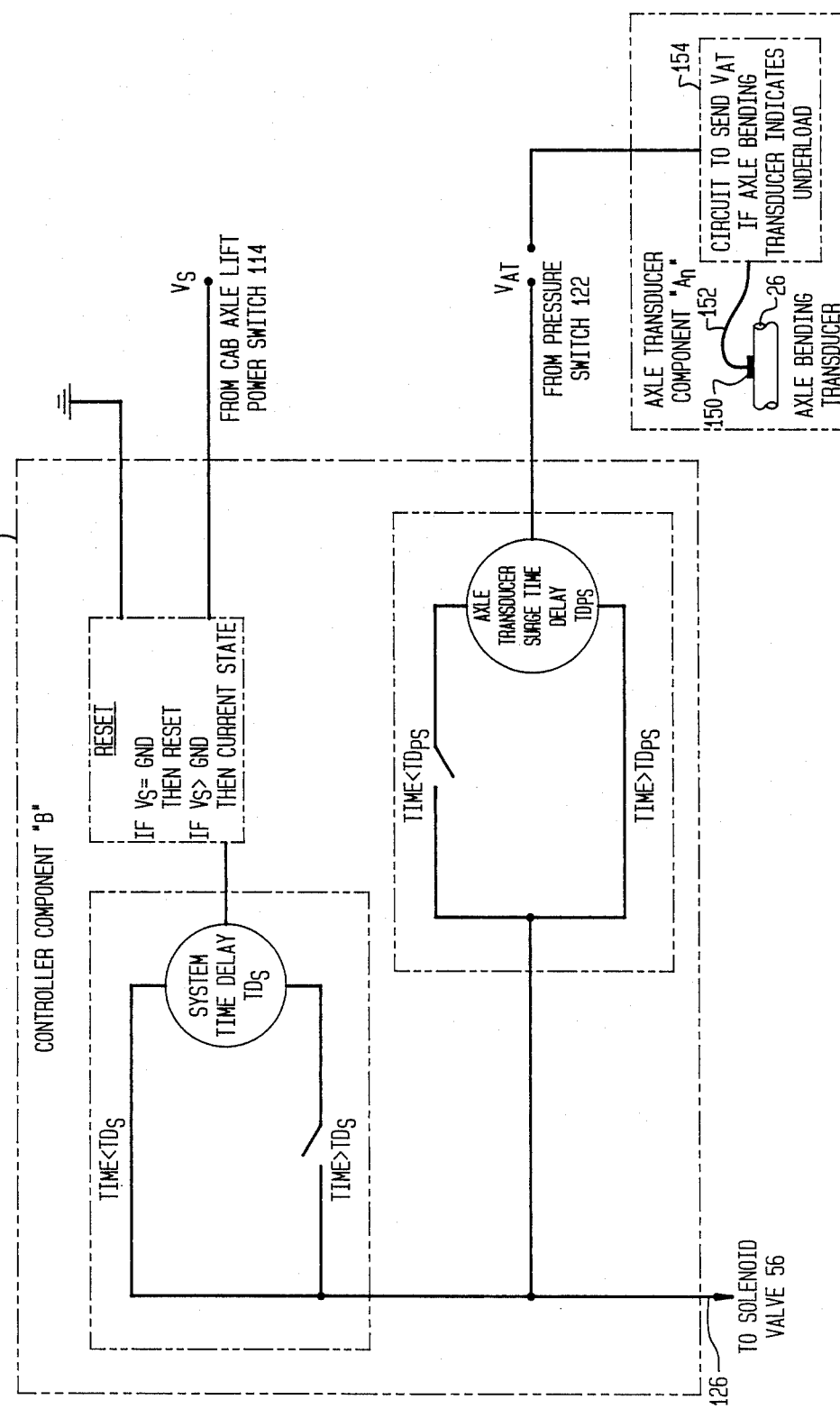
FIG. 6 is an electrical flowchart of the control system shown in FIG. 5.

FIG. 6 is a schematic flow diagram of the transducer-operated circuit illustrated in FIG. 5. The controller 120 essentially works the same as the controller described above with respect to FIG. 3. In this case the input to the controller from the sensor comprises a voltage which is generated from the transducer circuit 154.

Briefly, when the toggle switch 114 is closed, current flows to the system time delay $TD_S$, and directly to the solenoid valve 56 to raise the bogey axle 40 in the manner described above. After the time delay, the current is blocked to the solenoid unless the pressure sensed by the transducer 150 is below a predetermined value. If so, the current will continue to flow to the solenoid 56 to maintain the lift axle 40 in the raised position. On the other hand, if the load on the axle 26 is above a second predetermined value, above the first predetermined value, then a voltage will not be applied to the control circuit 120, after a very short time delay, to block further current flow to the solenoid valve 56.

Thus, the invention provides a system for automatically controlling the position of a liftable air spring suspension, yet allows the operator to interface with the control system to selectively raise the axle for short periods of time to enhance the maneuverability of the vehicle. The control system uses solid-state electronics and is far less costly than pneumatic systems which have been used in the past. Further, the electrical system has a high degree of reliability, durability and resistance to environmental extremes and air-supply contamination. Further, the system is very versatile in that the changing of the pressure switch or changing different set points will result in systems for different applications, that is, different load conditions. The system is easy to install, is tamperproof and requires no customer adjustment. Further, a single pressure sensor will allow the control of the lift axle by measuring the load on the down axle only. In the prior art devices, duplicate pressure sensors were required to measure the load both of the liftable and nonliftable axles. The invention further provides a means by which the driver of the vehicle can override the system very easily for greater flexibility in the use of the control system. Yet, on the other hand, it prevents the operation of the vehicle with the lift axle in a raised position when the down axle is overloaded for an extended period of time. Further, the invention provides a device which can be used to control multiple lifting axles with the addition of a pneumatic control valve. These advantages are not found in the prior art.

Whereas the invention has been described with reference to a two-axle suspension, the invention can also be used in suspensions with three or more axles wherein two or more axles are liftable. Further, whereas the invention has been described with reference to a control system for a liftable axle, the invention can also be used in suspensions wherein the load on a tandem axle is controlled rather than lifted. Thus, the invention can be used to simply eliminate the load on an axle and leave the axle in the down position.

Reasonable variation and modification are possible within the scope of the foregoing disclosure and drawings without departing from the spirit of the invention.

The embodiments of the invention in which an exclusive property or privilege is claimed are defined as follows:

1. In a control system for a lift axle in a two-axle suspension for wheeled vehicles wherein:

first and second axles are connected in tandem to a vehicle frame through first and second suspensions, respectively;

said second suspension having means to mount said second axle for movement between a raised position and a lowered position, and actuation means for moving said second axle between said raised and lowered positions;

said second axle having wheels for supporting engagement with the ground when the second axle is in the lowered position and said wheels being out of contact with the ground when said second axle is in a raised position;

control means having a means to detect a load on the first axle and for automatically raising said second axle to said raised position when the load on the first axle is below a first predetermined value, and a means for automatically lowering said second axle to said lower position when the load on said first axle is above a second predetermined value which is greater than the first predetermined value, and means to delay the operation of said actuation means to lower said second axle upon detection of a load on said first axle to compensate for road bumps;

the improvement which comprises:

said load-detecting means comprising electrical sensing means and said control means comprising electrical circuit means to control said activation means responsive to a signal from said electrical sensing means.

2. A control system according to claim 1 wherein said first suspension comprises an air spring and said means to detect a load on said first axle comprises means to detect the pressure in the said first suspension air spring.

3. A control system according to claim 2 wherein said second suspension comprises an air spring for cushioning said second axle with respect to said vehicle frame and an air cylinder for actuating the raising and lowering of said second axle with respect to said frame; said control means further comprising means to release air from said second suspension air spring and simultaneously to pressurize said air cylinder when said second axle is moved between said lowermost position and said raised position.

4. A control system for a lift axle according to claim 2 and further comprising means to manually override said control means, but only for a relatively short period of time, when said second axle is in a lowered position so that said second axle can be selectively raised for short periods of time to enhance maneuverability of said vehicle during said relatively short period of time.

5. A control system for a lift axle according to claim 4 wherein said relatively short period of time is substantially longer than the delay in the operation of said actuation means.

6. A control system for a lift axle according to claim 5 wherein said relatively short period of time is in the range of ½ minute to 3 minutes and said delay is in the range to ¼ to 2 seconds.

7. A control system for a lift axle according to claim 5 wherein said pressure detection means is a pressure switch which has a first electrical output when the pressure in said air spring corresponds to a load on said axle below said first predetermined value and has a second electrical output when the pressure in said air spring corresponds to a load on said axle above said second predetermined value.

8. A control system for a lift axle according to claim 7 wherein said first and second predetermined values correspond to a range of 5-15 psi in said air spring.

9. A control system for a lift axle according to claim 2 wherein said pressure detection means comprises a pressure switch which has a first electrical output when the pressure in said air spring corresponds to a load on said axle below said first predetermined value and has a second electrical output when the pressure in said air spring corresponds to a load on said axle above said second predetermined value.

10. A control system for a lift axle according to claim 9 wherein said first and second predetermined values correspond to a range of 5-15 psi in said air spring.

11. A control system according to claim 1 wherein said means to detect a load on said first axle comprises a strain gauge on said first axle.

12. A control system according to claim 1 wherein said means to delay the operation of said actuation means comprises an electrical time delay circuit.

13. A control system for a lift axle according to claim 1 and further comprising means to manually override said control means, but only for a relatively short period of time, when said second axle is in a lowered position so that said second axle can be selectively raised for short periods of time to enhance maneuverability of said vehicle during said relatively short period of time.

14. A control system for a lift axle according to claim 13 wherein said relatively short period of time is substantially longer than the delay in the operation of the actuation means.

15. A control system for a lift axle according to claim 13 wherein said relatively short period of time is in the range to ½ to 3 minutes and said delay is in the range of ¼ to 2 seconds.

16. In a control system for a lift axle in a two-axle suspension for wheeled vehicles wherein:
first and second axles are connected to a vehicle frame through first and second suspensions, respectively;
said second suspension having means to mount said second axle for movement between a raised position and a lowered position, and actuation means for moving said second axle between said raised and lowered positions;
said second axle having wheels for supporting engagement with the ground when the second axle is in the lowered position and said wheels being out of contact with the ground when said second axle is in a raised position;
control means having a means to detect a load on the first axle and for automatically raising said second axle to said raised position when the load on the first axle is below a first predetermined value, and a means for automatically lowering said second axle to said lower position when the load on said first axle is above a second predetermined value which is greater than the first predetermined value, and means to delay the operation of said actuation means to lower said second axle upon detection of a load on said first axle to compensate for road bumps;
the improvement which comprises:
means to manually override said control means, but only for a relatively short period of time, when said second axle is in a lowered position so that said second axle can be selectively raised for short periods of time to enhance maneuverability of said vehicle during said relatively short periods of time.

17. A control system for a lift axle according to claim 16 wherein said relatively short period of time is substantially longer than the delay in the operation of said actuation means.

18. A control system for a lift axle according to claim 17 wherein said relatively short period of time is in the range of ½ minute to 3 minutes and said delay is in the range of ¼ to 2 seconds.

19. A control system for a lift axle according to claim 18 wherein said first suspension comprises an air spring; said means to detect a load on said first axle comprises means to detect the pressure in said first suspension air spring; said pressure detection means comprises a pressure switch which has a first electrical output when the pressure in said air spring corresponds to a load on said axle below said first predetermined value and has a second electrical output when the pressure in said air spring corresponds to a load on said second axle above said second predetermined value.

20. A control system for a lift axle according to claim 19 wherein said first and second predetermined values correspond to a range of about 5-15 psi in said air spring.

21. A control system for a life axle in accordance with claim 16 wherein said means to detect a load on said first axle comprises a strain gauge on said first axle.

22. In a control system for adjusting loads on a two-axle suspension for wheeled vehicles wherein:

first and second axles are connected in tandem to a vehicle frame through first and second suspensions, respectively;

said second suspension having means to increase and decrease the load on said second axle; and control means having a means to detect a load on the first axle and for automatically controlling the load on said second axle to decrease the load thereon when the load on the first axle is below a first predetermined value, means for automatically increasing the load on said second axle when the load on said first axle is above a second predetermined value which is greater than the first predetermined value and means to delay the automatic control of the load on the second axle when the load on the first axle is above the second predetermined value to compensate for road bumps;

the improvement which comprises:

said load-detecting means comprising electrical sensing means and said control means comprising electrical circuit means to control the load on said second axle responsive to a signal from said second electrical circuit means.

23. In a control system for adjusting loads on a two-axle suspension for wheeled vehicles wherein:

first and second axles are connected in tandem to a vehicle frame through first and second suspensions, respectively;

said second suspension having means to increase and decrease the load on said second axle; and control means having a means to detect a load on the first axle and for automatically controlling the load on first second axle to decrease the load thereon when the load on the first axle is below a first predetermined value, and a means for automatically increasing the load on said second axle when the load on said first axle is above a second predetermined value which is greater than the first predetermined value;

the improvement which comprises:

means to manually override said control means, but only for a relatively short period of time, when the load on said first axle is above said second predetermined value so that the load on said second axle can be selectively decreased for short periods of time to enhance maneuverability of said vehicle during said relatively short periods of time.

* * * * *